US012403512B2

(12) United States Patent
Frysh et al.

(10) Patent No.: US 12,403,512 B2
(45) Date of Patent: Sep. 2, 2025

(54) JEWELRY CLEANING DEVICE

(71) Applicant: Gem Oasis, LLC, Atlanta, GA (US)

(72) Inventors: Jeffrey Frysh, Atlanta, GA (US); Evan Spirk, Gates Mills, OH (US); Danwei Ye, Solon, OH (US); William Eugene Rabbitt, Chesterland, OH (US); Paul Dana Stephens, Twinsburg, OH (US)

(73) Assignee: Gem Oasis, LLC, Atlanta, GA (US)

( * ) Notice: Subject to any disclaimer, the term of this patent is extended or adjusted under 35 U.S.C. 154(b) by 247 days.

(21) Appl. No.: 17/980,398

(22) Filed: Nov. 3, 2022

(65) Prior Publication Data

US 2023/0133098 A1 May 4, 2023

Related U.S. Application Data

(60) Provisional application No. 63/275,014, filed on Nov. 3, 2021.

(51) Int. Cl.

| | |
|---|---|
| ***B08B 11/02*** | (2006.01) |
| ***A46B 13/02*** | (2006.01) |
| ***B08B 1/12*** | (2024.01) |
| ***B08B 1/20*** | (2024.01) |
| ***B08B 3/12*** | (2006.01) |

(52) U.S. Cl.

CPC ............ *B08B 11/02* (2013.01); *A46B 13/023* (2013.01); *B08B 1/12* (2024.01); *B08B 1/20* (2024.01); *B08B 3/12* (2013.01); *A46B 2200/3073* (2013.01)

(58) Field of Classification Search

CPC .. B08B 11/02; B08B 3/12; B08B 1/12; G04D 3/083; G04D 3/08; G04D 3/086; A46B 13/023; A47L 15/13

USPC ........................................................ 134/137

See application file for complete search history.

(56) References Cited

U.S. PATENT DOCUMENTS 2,533,747 A * 12/1950 Thienemann ........ G02B 25/005 356/244
2,643,661 A 6/1953 Shanahan Jr.
3,413,989 A 12/1968 Fochendorffer (Continued)

FOREIGN PATENT DOCUMENTS

CN 104511449 4/2015
KR 10-2196168 B1 12/2020
WO WO1992004852 A1 * 4/1992

OTHER PUBLICATIONS

Translation of WO1992004852A1 (Year: 1992).*

(Continued)

*Primary Examiner* — Tom Rodgers

(74) *Attorney, Agent, or Firm* — David I. Principe; Phillips Lytle LLP

(57) ABSTRACT

A jewelry cleaning device includes a housing, a cleaning mechanism, and a ring holder. The ring holder can be moveable with respect to the housing among at least two positions. The ring holder can include a moveable grip. The housing can include an upper housing assembly and a lower housing assembly. The upper housing assembly can include a lid moveable with respect to an upper housing between an open position and a closed position. The upper housing assembly can move with respect to the lower housing assembly between an open position and a closed position.

14 Claims, 16 Drawing Sheets

(56) References Cited

U.S. PATENT DOCUMENTS

| | | | | |
|---|---|---|---|---|
| 3,771,772 | A * | 11/1973 | Honda | D06F 19/00<br>310/317 |
| 4,112,955 | A * | 9/1978 | Gollel | G07F 17/20<br>134/143 |
| 4,114,194 | A * | 9/1978 | Walter | A47L 15/4259<br>310/318 |
| 5,335,394 | A * | 8/1994 | Cunningham, Jr. | B08B 11/00<br>15/310 |
| 6,719,850 | B2 | 4/2004 | Glucksman et al. | |
| 8,893,735 | B2 | 11/2014 | Shatz | |
| 2005/0061359 | A1 * | 3/2005 | Taylor | B08B 3/10<br>134/140 |
| 2012/0169076 | A1 * | 7/2012 | Brake | A47G 25/902<br>294/3.6 |
| 2012/0192895 | A1 | 8/2012 | Shatz | |
| 2020/0094292 | A1 | 3/2020 | Accattato | |

OTHER PUBLICATIONS

Korean Intellectual Property Office, Written Opinion of the International Searching Authority, Feb. 24, 2023, International Application No. PCT/US2022/048886.

* cited by examiner 1021
1009
1066
1086
1102
1099
1089
1096
1105
1006
1093

JEWELRY CLEANING DEVICE

CROSS-REFERENCE TO RELATED APPLICATION

The present application claims priority benefit of U.S. Provisional Patent Application No. 63/275,014 filed on Nov. 3, 2021, entitled "Jewelry Cleaning Device," which is hereby incorporated by reference.

BACKGROUND OF THE INVENTION

Jewelry cleaning devices exist that include a bath of cleaning solution where the bath vibrates in the sonic or ultrasonic range to dislodge particles from the jewelry. Drawbacks of these known jewelry cleaning devices include cumbersome ways in which the article of jewelry is held in the jewelry cleaning device during a cleaning cycle. What is needed is an improved jewelry cleaning device.

SUMMARY OF THE INVENTION

In view of the foregoing, an example of a jewelry cleaning device includes a housing, a bath located in the housing, a cleaning brush mounted to the housing, and a ring holder connected with the housing. The bath is configured to hold a cleaning solution. The ring holder is configured to hold a ring to be cleaned by the jewelry cleaning device. The ring holder is moveable with respect to the housing between a first position where the ring holder positions the ring offset from the bath and the cleaning brush and a second position where the ring holder positions the ring in the bath.

In another aspect, the ring holder is connected with or part of an arm that pivots with respect to the housing.

In another aspect, at least a portion of the cleaning brush is disposed in the cleaning solution in the bath.

In another aspect, a transducer cooperates with the bath for vibrating the bath.

Another aspect of the invention comprises a plurality of bristles connected with the housing and positioned above the cleaning brush with respect to a support surface on which the housing rests. The ring holder positions the ring above the plurality of bristles when in the first position and the ring holder positions the ring below the plurality of bristles when in the second position.

In yet another aspect, the cleaning brush further comprises a cleaning brush housing with bristles and a vibration motor disposed thereon.

In another aspect, the ring holder includes a fixed grip and a movable grip that is moveable with respect to the fixed grip.

Another aspect of the invention includes an upper housing assembly and a lower housing assembly. The upper housing assembly includes a lid pivotable with respect to an upper housing between an open position and a closed position.

In yet another aspect, the ring holder comprises a pair of opposed members spring biased in an open position. The opposed members are configured to fit inside a band portion of the ring to hold the ring in position.

In another aspect of the invention a silicone material is disposed on at least one of the opposed members.

Another aspect of the invention comprises one or more magnets disposed on one of the upper housing assembly and the lower housing assembly. The magnets are configured to provide a force holding the upper housing assembly and the lower housing assembly together.

In yet another aspect, the jewelry cleaning device further comprises a raised portion on one of the upper housing assembly and lower housing assembly and an opening on the other of the upper housing assembly and lower housing assembly such that the raised portion provides an alignment guide for connecting the upper housing assembly to the lower housing assembly.

In another example of a jewelry cleaning device, such a jewelry cleaning device includes a housing. A bath is located in the housing and configured to hold the cleaning solution. A cleaning brush housing is mounted to the housing. The cleaning brush housing has bristles and a vibration motor disposed thereon. A ring holder is connected with the housing and configured to hold the ring.

The ring holder is movable with respect to the housing between a first position where the ring holder positions the ring offset from the bath and the cleaning brush and a second position where the ring holder positions the ring in the bath.

A transducer cooperates with the bath for vibrating the bath.

DETAILED DESCRIPTION

Figure 1:
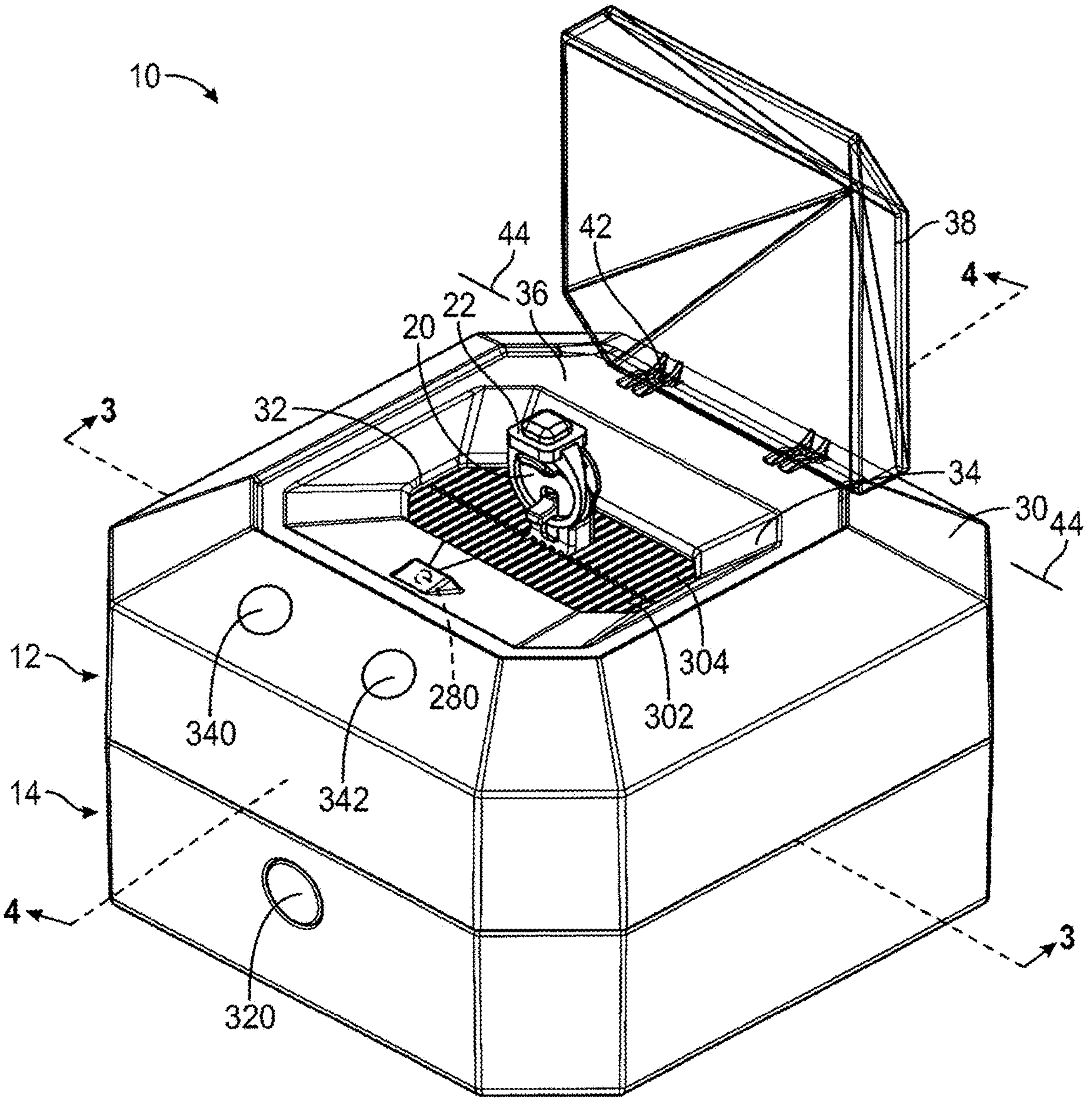
FIG. 1 is a perspective view of a jewelry cleaning device with a lid in an open position.

With reference to FIG. 1, a jewelry cleaning device 10 is shown generally including a housing, which in the illustrated embodiment includes an upper housing assembly 12 and a lower housing assembly 14. The jewelry cleaning device 10 further includes a cleaning mechanism that, with reference to FIG. 2, can include cleaning brushes 16 and a bath 18 housed within the housing. With reference back to FIG. 1, the jewelry cleaning device 10 further includes a ring holder 20 configured to hold a ring 22 to be cleaned by the jewelry cleaning device 10.

Figure 3:
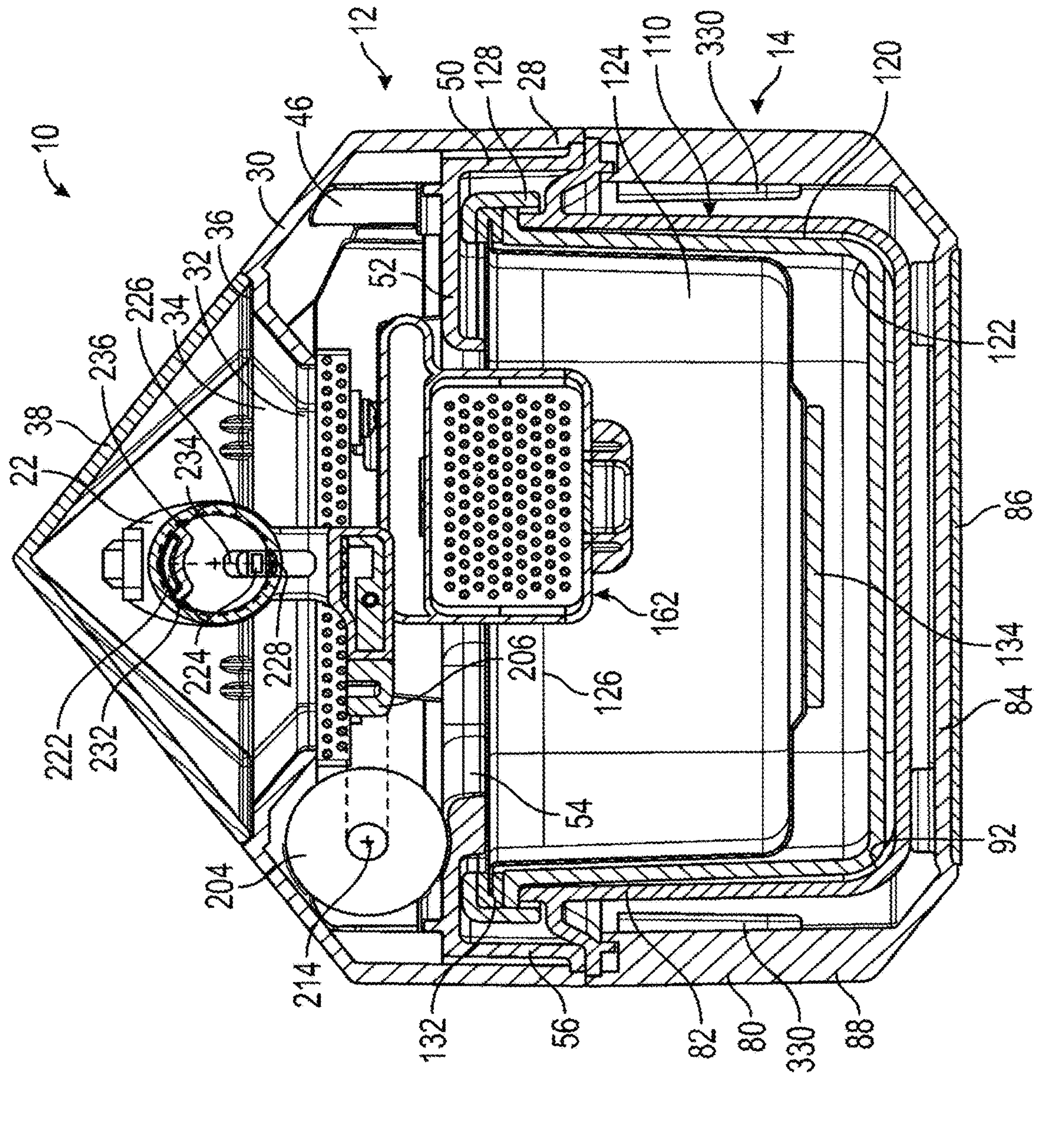
FIG. 3 is a cross-sectional view taken through line 3-3 in FIG. 1, but with the lid shown in the closed position.

The upper housing assembly 12 generally includes an upper housing 30, which in the depicted embodiment is in the shape of a frustum at an upper portion with vertical sidewall sections 28 (FIG. 3) beneath the frustum shaped portion. The upper housing 30 includes an upper opening 32 surrounded by a recess 34 formed in a horizontally oriented top wall section 36. A lid 38 connects with the upper housing 30 at a hinge connection 42, which allows the lid 38 to rotate about a lid pivot axis 44 with respect to the upper housing 30. Alternatively, the lid 38 could be moveable with respect to the upper housing 30 in another manner, e.g., being simply removeable from the upper housing 30. In the illustrated embodiment, the lid 38 is made from a transparent material and is generally pyramid-shaped. With reference to FIG. 3, the upper housing 30 includes standoffs 46 to facilitate connection between the upper housing 30 and an upper housing insert 50. The upper housing insert 50 includes an upper horizontal portion 52 that defines an upper insert opening 54. The upper housing insert 50 also includes downwardly depending vertical sections 56 that are coplanar with the lower horizontal sections of the upper housing 30.

Figure 2:
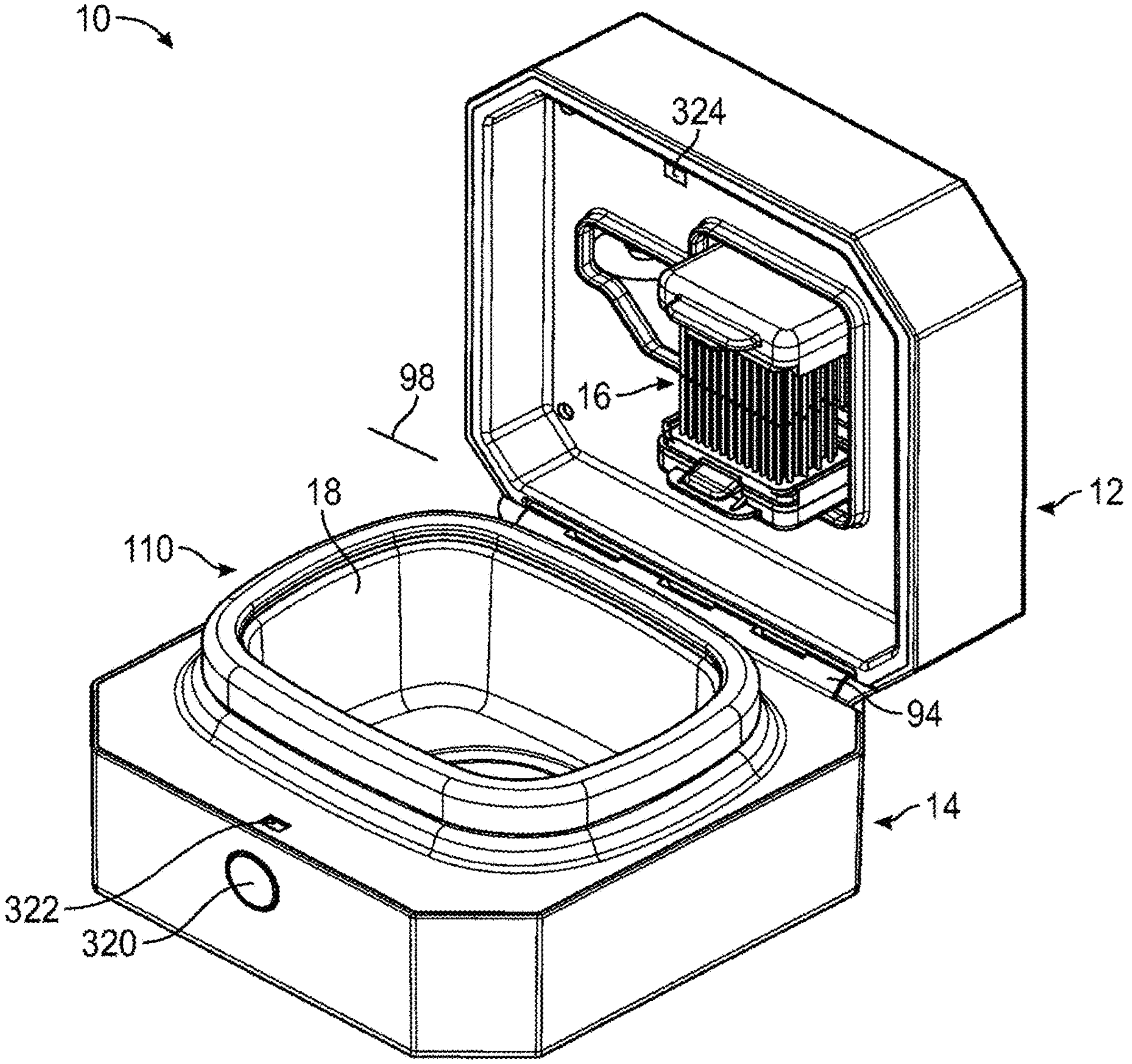
FIG. 2 is a perspective view of the jewelry cleaning device with the upper housing assembly shown in an open position.

With reference to FIG. 3, the lower housing assembly 14 includes a lower housing 80 connected with a lower housing lid 82. The lower housing 80 includes a horizontally oriented base 84. A rubber-like (or similar non-slip material) mat 86 can attach to the base 84. The lower housing 80 can include vertical sidewall sections 88 to define a hollow interior that receives the lower housing lid 82. Similar to the lower housing 80, the lower housing lid 82 is generally basin-shaped to define a bath assembly cavity 92. The lower housing lid 82 also includes a hinge portion 94 (see FIG. 2) for connecting with an associated hinge portion 96 (see FIG. 4) provided on the upper housing 30 to pivotally attach the upper housing assembly 12 to the lower housing assembly 14. With reference to FIG. 2, the upper housing assembly 12 is pivotable about a housing pivot axis 98 with respect to the lower housing assembly 14 between an open position (shown in FIG. 2) and a closed position (shown in FIG. 1).

With reference to FIG. 2, with the upper housing assembly 12 in the open position, a bath assembly 110, which is received in the lower housing assembly 14, is accessible for removal from the lower housing assembly 14. The bath assembly 110 can be removed from the lower housing assembly 114 for cleaning and maintenance reasons. Also, the bath assembly may be removed to allow for dumping and refilling the cleaning solution that is to be used in the jewelry cleaning device 10.

The bath assembly 110 generally includes a bath lower housing 120 that is received in the bath assembly cavity 92 formed in the lower housing lid 82. The bath lower housing 120 is similar in configuration to the lower housing lid 82 in that it is generally basin-shaped having a horizontal base with vertical side sections. The bath lower housing 120 has an open top to define a bath cavity 122 in which is received a bath 124 that is configured to hold the cleaning solution typically used to clean jewelry. The bath 124 defines a fill line 126 (only shown in FIG. 3), which is a line to which the cleaning solution received in the bath 124 is to be filled. The bath assembly 110 further includes a bath upper housing 128 that connects with an upper edge of the bath 124 and sandwiches a bath seal 132 between the bath upper housing 128 and the upper edge of the bath 124. The bath assembly 110 further includes a transducer 134 mounted to the bath 124. The transducer 134 electrically connects with a first electrical connector 136 (depicted schematically in FIG. 4), which can be provided on a lower surface of the bath lower housing 120. A second electrical connector 138 (depicted schematically in FIG. 4), which connects with a power source (not shown) via an electrical connection line 142 (depicted schematically in FIG. 4), is provided on the lower surface of the bath lower housing 120 within the bath assembly cavity 92. The transducer 134 is provided for vibrating the bath 124 in the ultrasonic range when turned ON to receive electrical power. The first electrical connector 136 is disconnectable with the second electrical connector 138 when the bath assembly 110 is removed from the lower housing assembly 14. Similarly, when the bath assembly 110 is placed back into the lower housing assembly 14, the first electrical connector 136 reconnects with the second electrical connector 138 so that power can be provided to the transducer 134.

Figure 4:
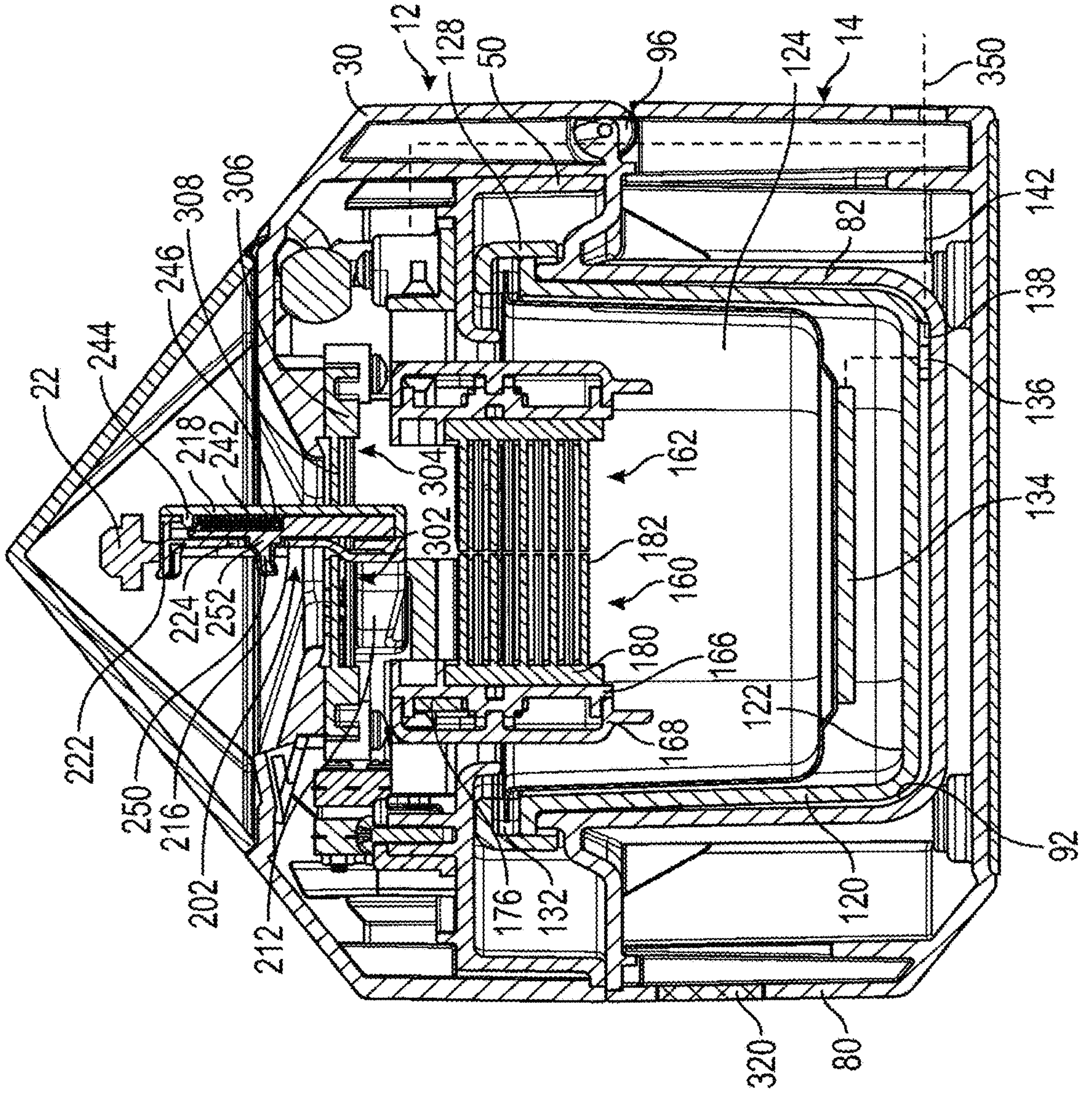
FIG. 4 is a cross-sectional view taken through line 4-4 in FIG. 1 with the lid in the closed position.

As mentioned above, the jewelry cleaning device 10 includes cleaning brushes 16, which can be part of cleaning brush assemblies 160, 162 mounted to the housing. With reference to FIG. 4, in the illustrated embodiment the cleaning brush assemblies 160, 162 are mounted to the upper housing assembly 12, and more particularly to the upper housing insert 50. The cleaning brush assemblies 160, 162 are opposed from one another and each is similar in configuration; therefore, the first cleaning brush assembly 160 will be described with particularity with the understanding that the second cleaning brush assembly 162 is similarly configured.

Figure 5:
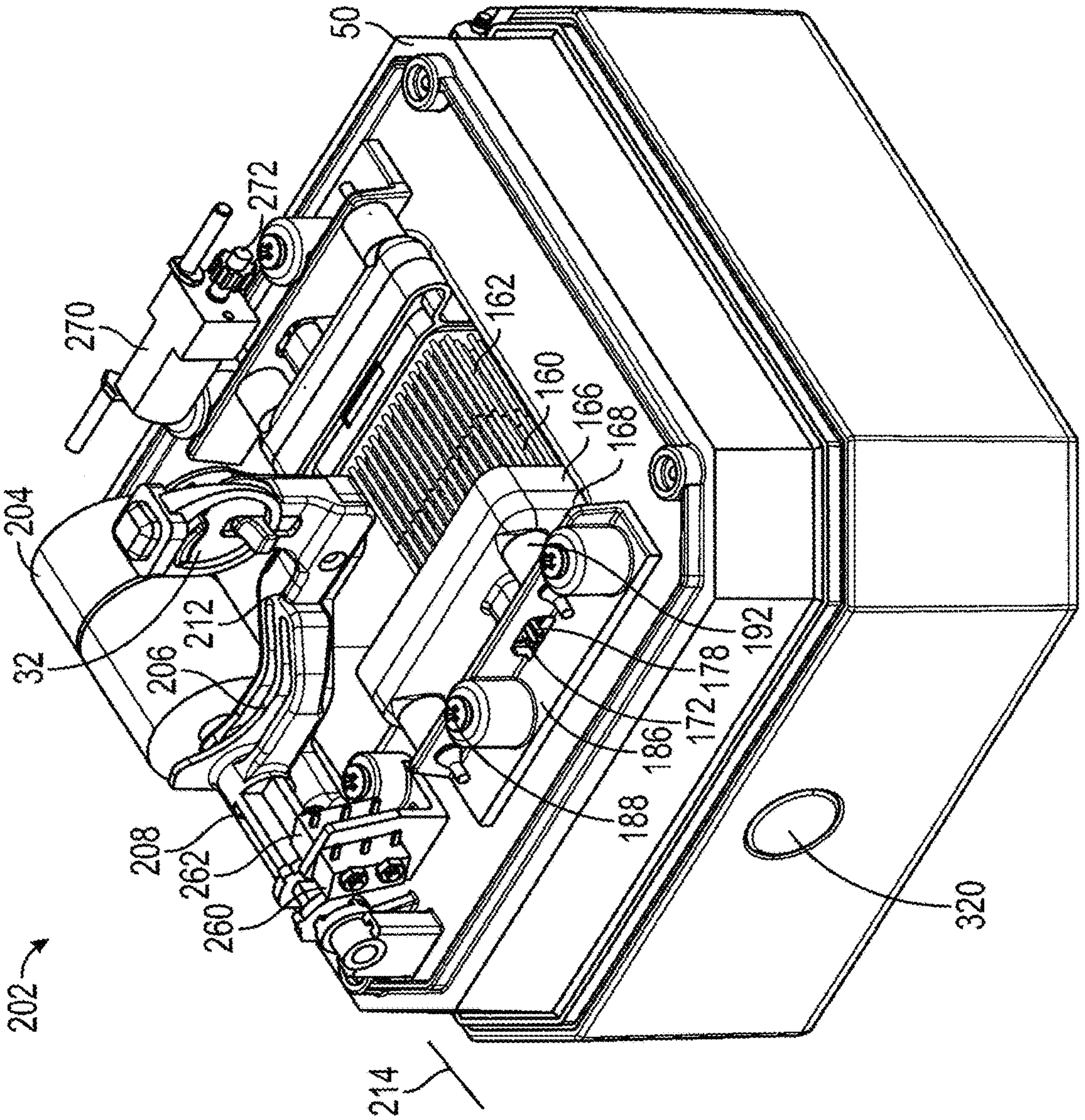
FIG. 5 is a perspective view of the jewelry cleaning device with the lid, an upper housing and upper brush removed.

With reference also to FIG. 5, the first cleaning brush assembly 160 includes a front brush housing 166 connected with a rear brush housing 168. The rear brush housing 168 includes a wire routing opening 172 (visible in FIG. 5). With reference to FIG. 4, a vibration motor 176 is positioned between the front brush housing 166 and the rear brush housing 168 and receives power through wiring 178 (only a portion shown in FIG. 5) passed through the wire routing opening 172. With reference to FIG. 4, the first cleaning brush assembly 160 includes a bristle mounting pad 180 that mounts to the front brush housing 166. A plurality of bristles 182 extend from the bristle mounting pad 180 away from the front brush housing 166 toward the second cleaning brush assembly 162. The bristle mounting pad 180 can releasably connect to the front brush housing 166 by being slid into the front brush housing 166 and snap into place so that the bristle mounting pad 180 with the associated plurality of bristles 182 can be replaceable. As evident in FIG. 3, at least a portion of each of the cleaning brush assemblies 160, 162 can be disposed below the fill line 126 of the bath 124. With reference to FIG. 5, a mounting bracket 186 connects the front brush housing 166 and the rear brush housing 168 to the upper housing insert 50 via fasteners 188. Vibration isolators 192, which can be made from a rubber-like material, connect the rear brush housing 168, which is connected with the front brush housing 166, to the mounting bracket 186. As such, when the vibration motor 176 is operating, the first cleaning brush assembly 160 vibrates and the vibration isolators 192 dampen the vibration with respect to the mounting bracket 186.

With reference to FIGS. 1 and 5, the ring holder 20 is part of a ring holder mechanism 202. With particular reference to FIG. 5, the ring holder mechanism 202 includes a ring arm motor 204 operatively connected with a ring arm 206 that includes an axle section 208 and an arm extension 212 extending from the axle section 208. The axle section 208 connects with an output shaft (not visible) of the ring arm motor 204 for rotational movement about a ring arm axis 214. With reference to FIG. 4, the ring holder mechanism 202 further includes a ring mount front 216 connected with a ring mount back 218 that each extend upwardly from the arm extension 212 (see FIG. 5) of the ring arm 206. The ring holder 20 includes at least two grips, which in the illustrated embodiment include a fixed grip 222 and a moveable grip 224. With reference to FIG. 3, the fixed grip 222 is positioned above the moveable grip 224 with respect to a support surface on which the housing 12, 14 rests. In the illustrated embodiment, the fixed grip 222 is curved to generally follow a circle so that the two grips 222, 224 define at least three contact points on the circle 226 which can be an inner circumference of the associated ring 22 to be cleaned by the jewelry cleaning device 10. With continued reference to FIG. 3, a first contact point 228 is located on the circle 226. A second contact point 232 is also located on the circle 226 and is disposed on a first side of a diameter 234 intersecting the first contact point 228. A third contact point 236 is also located on the circle 226 but is disposed on a second, opposite side of the diameter 234 intersecting the first contact point 228. In the illustrated embodiment, one fixed grip 222 is provided on the ring holder 20; however, two fixed grips each associated with the second contact point 232 and the third contact point 236, respectively, can be provided. Both of the grips 222 and 224 can be covered by an elastomer or other rubber-like material. With reference to FIG. 3, the second contact point 232 is angularly offset from the third contact point 236 about 45°. If desired, the angular offset can be reduced to at least about 15°. This angular offset provides a more robust connection for the associated ring 22 to be cleaned during the cleaning process.

With reference back to FIG. 4, a spring 242 is trapped between the ring mount front 216 and the ring mount back 218. The ring mount back 218 includes a spring seat 244 and the moveable grip 224 also includes a spring seat 246 such that the spring 242 is trapped between the spring seat 244 on the ring mount back 218 and the spring seat 246 on the moveable grip 224. The spring 242 is a compression spring that biases the moveable grip 224 downward per the orientation shown in FIG. 4. The moveable grip 224 includes a finger 250 that extends through a slot 252 provided in the ring mount front 216. The moveable grip 224 is moveable with respect to the fixed grip 222 and biased by the spring 242 to accommodate rings of different sizes.

Figure 6:
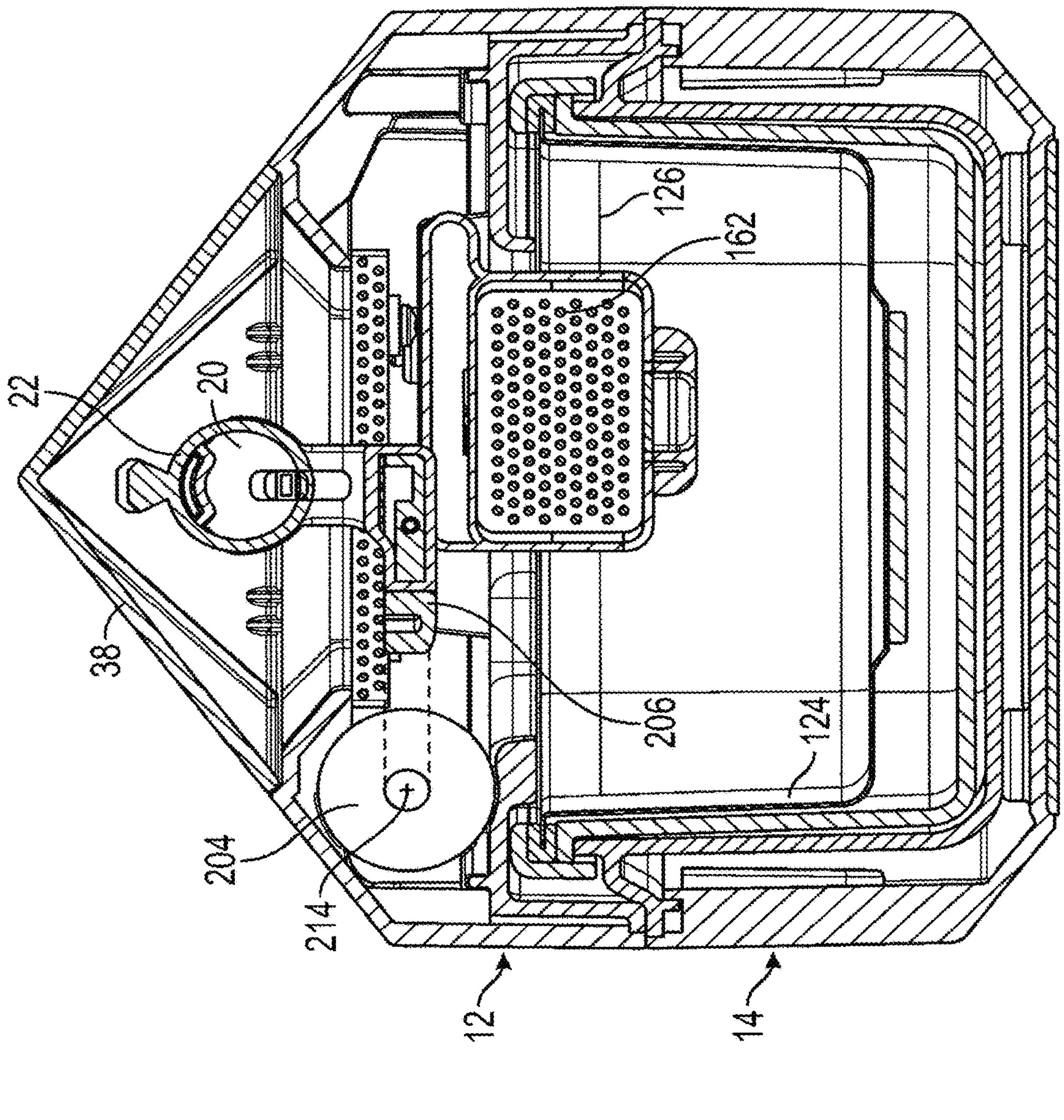
FIG. 6 is a schematic cross-sectional view of the jewelry cleaning device with a ring holder in a first position.
Figure 7:
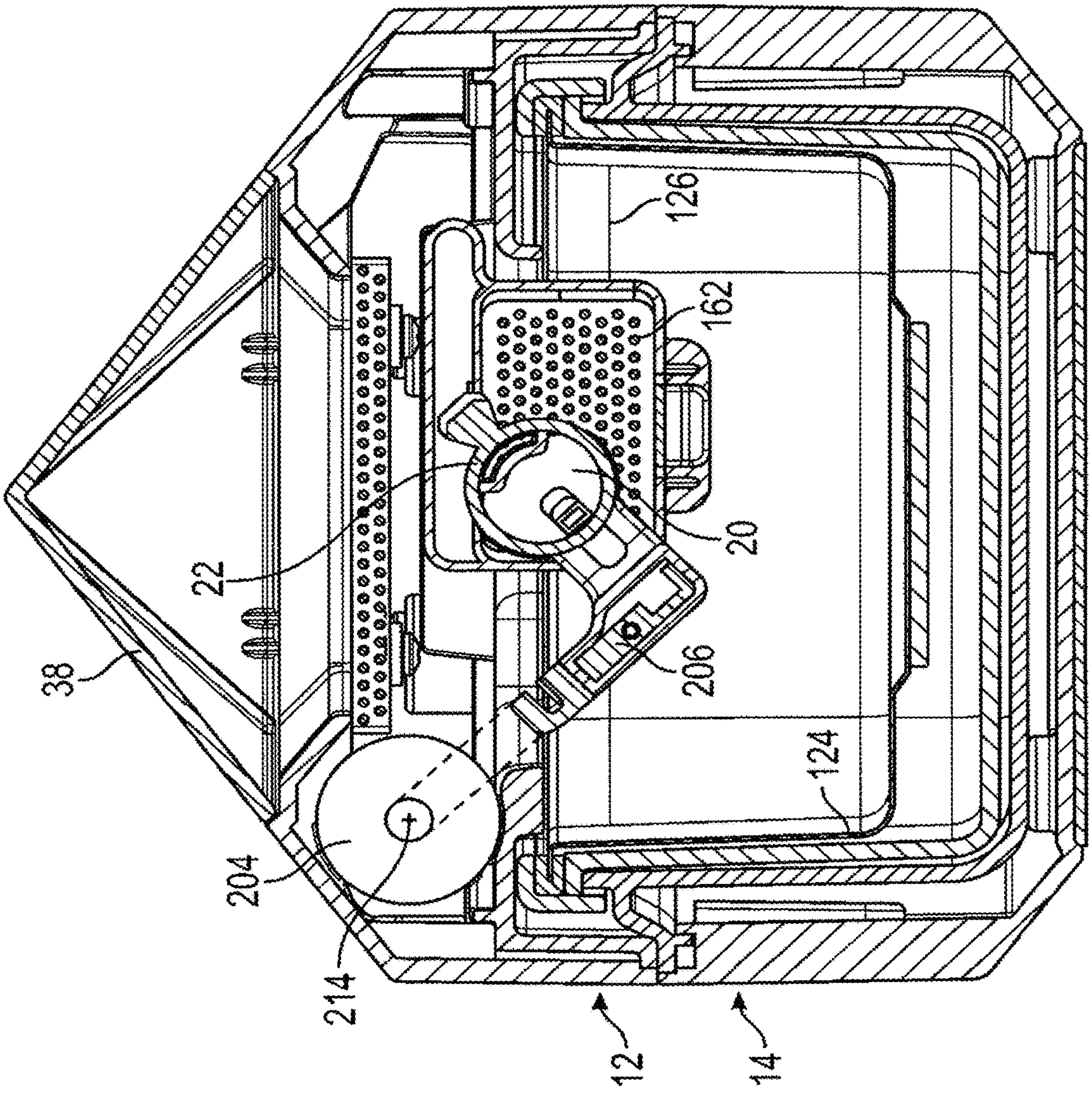
FIG. 7 is a schematic cross-sectional view of the jewelry cleaning device with the ring holder in a second position.
Figure 8:
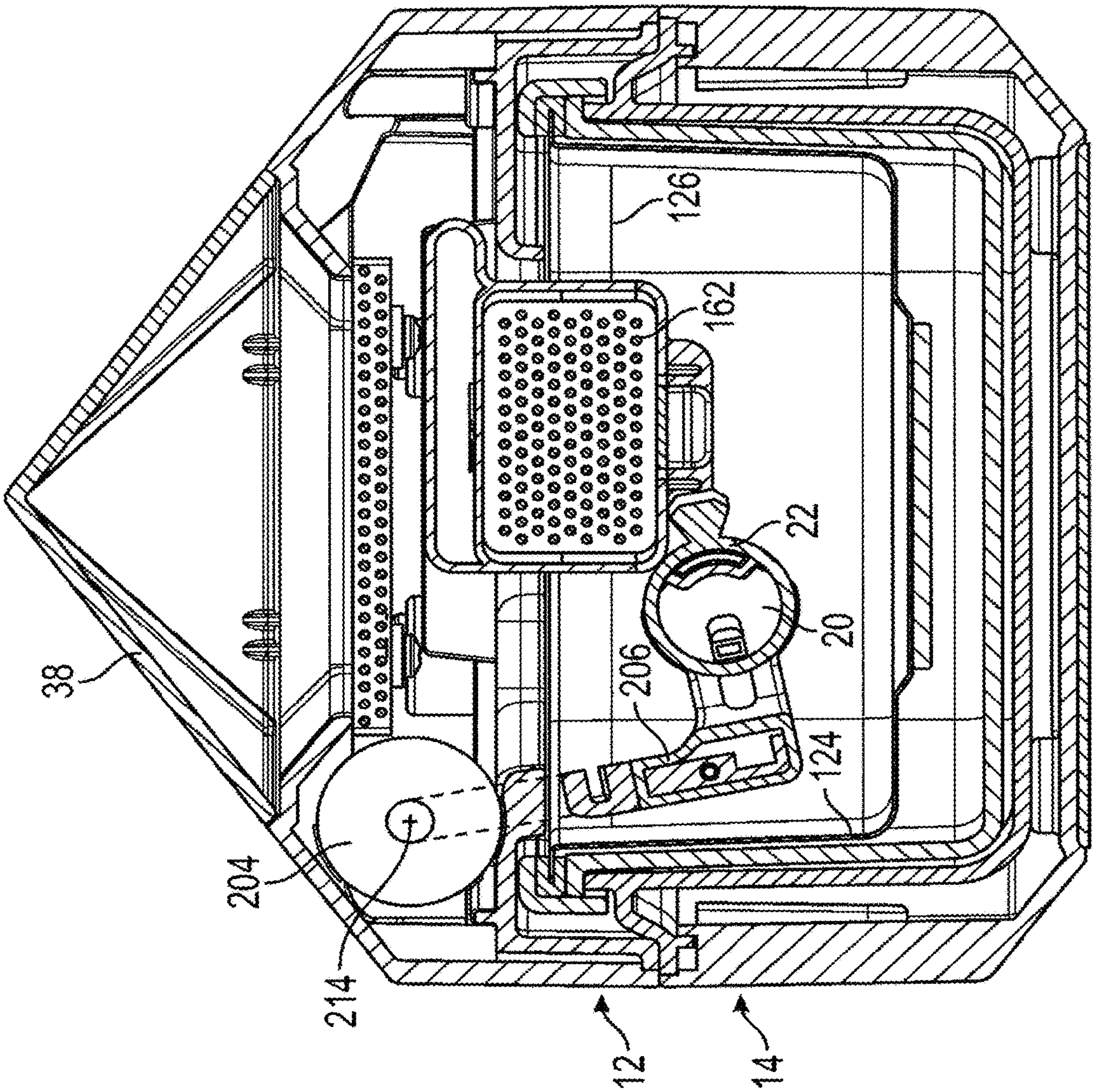
FIG. 8 is a schematic cross-sectional view of the jewelry cleaning device with the ring holder in a third position.

As mentioned above, the ring arm motor 204 drives the ring arm 206 for rotation about the ring arm axis 214. With reference to FIGS. 6, 7, and 8 the ring holder 20 is moveable with respect to the housing 12, 14 among at least three positions. FIG. 6 depicts a first position where the ring holder 20 positions the associated ring 22 offset from the bath 124 and the cleaning brush assemblies 160, 162. FIG. 7 depicts a second position where the ring holder 20 positions the associated ring 22 with respect to the cleaning brush assemblies 160, 162 for contact with the cleaning brushes. FIG. 8 depicts a third position where the ring holder 20 positions the associated ring 22 in the bath 124 beneath the fill line 126.

With reference back to FIG. 5, a switch assembly, which can include a first limit switch 260 and a second limit switch 262 can control the ring arm motor 204 and thus the position of the ring holder 20. For example, the ring 22 to be cleaned can be mounted to the ring holder 20 in the manner shown in FIG. 1. The lid 38 can then be placed into the closed position shown in FIG. 4. The jewelry cleaning device 10 can then be turned on a manner that will be described in more detail below. With the jewelry cleaning device 10 in the ON state, power is delivered to the transducer 134 and the vibration motors 176. The ring arm 206 then moves from the position shown in FIG. 6 to the lower cleaning position shown in FIG. 8. The angular displacement between the position shown in FIG. 6 and the position shown in FIG. 8 is about 80° (plus or minus 5°). The angular displacement of about 80° trips the first limit switch 260 (FIG. 5) and the ring arm 206 pauses in the position shown in FIG. 8 for a soak time, which can be a predetermined amount of time such as about 20 seconds. After the predetermined amount of time has elapsed, the ring arm 206 moves to the position shown in FIG. 7, which can be about 45° angularly offset from the position shown in FIG. 6 (plus or minus about 5°). With the ring arm 206 shown in the position in FIG. 7, the second limit switch 262 trips and the ring arm 206 can return to the position shown in FIG. 8. Movement between the positions shown in FIGS. 7 and 8 can be repeated for a predetermined number of cycle times, such as five cycle times. After five cycles, for example, between the position shown in FIG. 7 and the position shown in FIG. 8, the ring arm 206 can remain in the position shown in FIG. 8 for a second predetermined amount of time which can be about 120 seconds. After the second predetermined amount of time elapses, power can be turned OFF to the transducer 134 and the vibration motors 176. The ring arm 206 can then return to the position shown in FIG. 6.

With reference back to FIG. 5, the jewelry cleaning device 10 can further include a lid motor 270 that drives a pinion 272. The pinion 272 can be operatively connected with a gear (not shown) connected with the lid 38. After the cleaning cycle described in the aforementioned paragraph, the lid motor 270 can receive power to drive the pinion 272 to open the lid 38. With reference back to FIG. 1, the jewelry cleaning device 10 can further include a light source 280 connected with the housing, which in the illustrated embodiment is connected with the upper housing assembly 12 and more particularly is provided in the recess 34 on the upper housing 30. The light source 280, which can be an LED, is positioned on the housing and configured to direct light toward the ring holder 20 when the ring holder 20 is in the first position, which is shown in FIGS. 1 and 6. After the cleaning cycle described above power can be delivered to the light source 280 to illuminate the ring 22.

With reference to FIGS. 1 and 4, upper brushes 302, 304 are positioned above the cleaning brush assemblies 160, 162. Each upper brush 302, 304 is similarly configured. As such, the second upper brush 304 will be described with particularity with the understanding that the first upper brush 302 is similarly configured. The second upper brush includes a brush mount 306 and a plurality of silicone bristles 308 extending from the brush mount 306 toward the first upper brush 302. The brush mount 306 mounts to the upper housing 30 and the plurality of silicone bristles 308 extend into the upper opening 32 to obscure the internal components of the jewelry cleaning device 10. The plurality of silicone bristles 308 can also operate as a wiper to remove residual cleaning solution from the ring 22 being cleaned by the jewelry cleaning device 10. With the ring holder 20 in the first position (shown in FIGS. 1 and 6) the ring holder 20 positions the associated ring 22 above the plurality of silicone bristles 308. With reference to FIGS. 6 and 7, the ring holder 20 positions the associated ring 22 below the plurality of bristles 308 when both in the second position (FIG. 7) and the third position (FIG. 8).

With reference back to FIG. 2 and also with reference to FIG. 1, the ring holder 20 and the cleaning brush assemblies 160, 162 are mounted to the upper housing assembly 12 for movement with the upper housing assembly 12 as the upper housing assembly 12 moves with respect to the lower housing assembly 14. This allows for easy removal of the bath assembly 110. With reference to FIG. 2, a button 320 provided on the lower housing assembly 14 can operatively connect with a latch 322 also on the lower housing assembly 14. Depressing the button 320 can move the latch 322 into disengagement with a catch 324 provided on the upper housing assembly 12 to allow for movement of the upper housing assembly 12 with respect to the lower housing assembly 14. The upper housing assembly 12 can pivot about the housing pivot axis 98 with respect to the lower housing assembly 14. Alternatively, other types of movement of the upper housing assembly 12 with respect to the lower housing assembly 14 could be provided, for example, complete removal of the upper housing assembly 12 from the lower housing assembly 14. When pivotal movement is desired, and with reference back to FIG. 3, weights, e.g., lead weights 330, can be provided in the lower housing assembly 14 to prevent the jewelry cleaning device 10 from falling backwards when the upper housing assembly 12 is pivoted with respect to the lower housing assembly 14.

With reference back to FIG. 1, a first button 340 and a second button 342 can be provided on the upper housing assembly 12. The first button 340 can operate a switch (not shown) to control delivery of power to the lid motor 270 (FIG. 5) such that operation of the first button 340 results in the lid 38 moving from the closed position toward the open position, which is shown in FIG. 1. The second button 342 can operate a switch electrically connected with the ring arm motor 204, the vibration motors 176, and the transducer 134 such that when one depresses the second button 342 the jewelry cleaning device 10 is turned ON into a cleaning mode. With reference back to FIG. 4, power can be provided to the jewelry cleaning device 10 via an electrical cord 350 (depicted schematically), which can connect with a wall electrical outlet.

Figure 9:
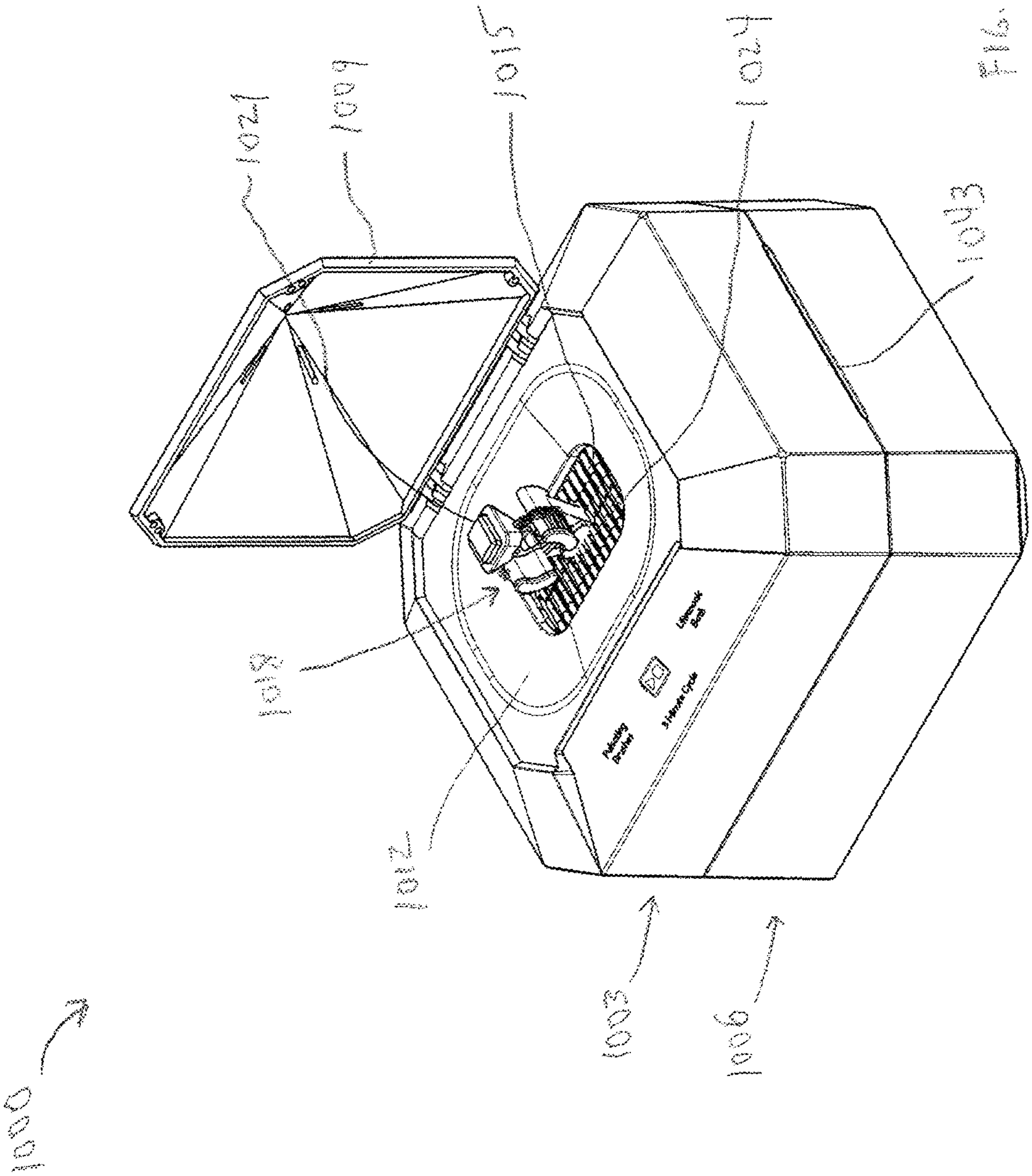
FIG. 9 is a perspective view of an alternate embodiment of the jewelry cleaning device of the present invention.

Referring generally to FIGS. 9-17, and initially to FIG. 9, an alternate embodiment of the jewelry cleaning device 10 is shown. A jewelry cleaning device 1000 is shown generally including a housing, which in the illustrated embodiment includes an upper housing assembly 1003 and a lower housing assembly 1006. The upper housing assembly 1003 may be provided with a lid 1009 that may be pivotally attached thereto. The lid 1009 may rotate between an open position shown in FIG. 9 and a closed position shown in FIGS. 16-17. In the center of the upper housing assembly 1003 a recessed portion 1012 borders an opening 1015. The upper portion of a ring holder mechanism 1018 extends upward through the opening 1015 into the space defined by the lid 1009. A ring 1021 is attached to the ring holder mechanism 1018 as will be described in greater detail herein. A plurality of bristles 1024 are shown in the opening 1015 such that the ring 1021 passes through the bristles 1024 when it moves downward as described in greater detail herein. The upper housing assembly 1003 may removably attach to the lower housing assembly 1006. In the embodiment shown, the upper housing assembly 1003 is lifted vertically to separate the upper housing assembly 1003 from the lower housing assembly 1006. The upper housing assembly 1003 and the lower housing assembly may have electrical contacts between them configured to make an electrical connection so that power from the lower housing assembly 1006 can be distributed to the motors in the upper housing assembly 1009 such as the ring arm motor 1063 and the vibration motor 1099 in the brush housing 1084 described below.

Figure 10:
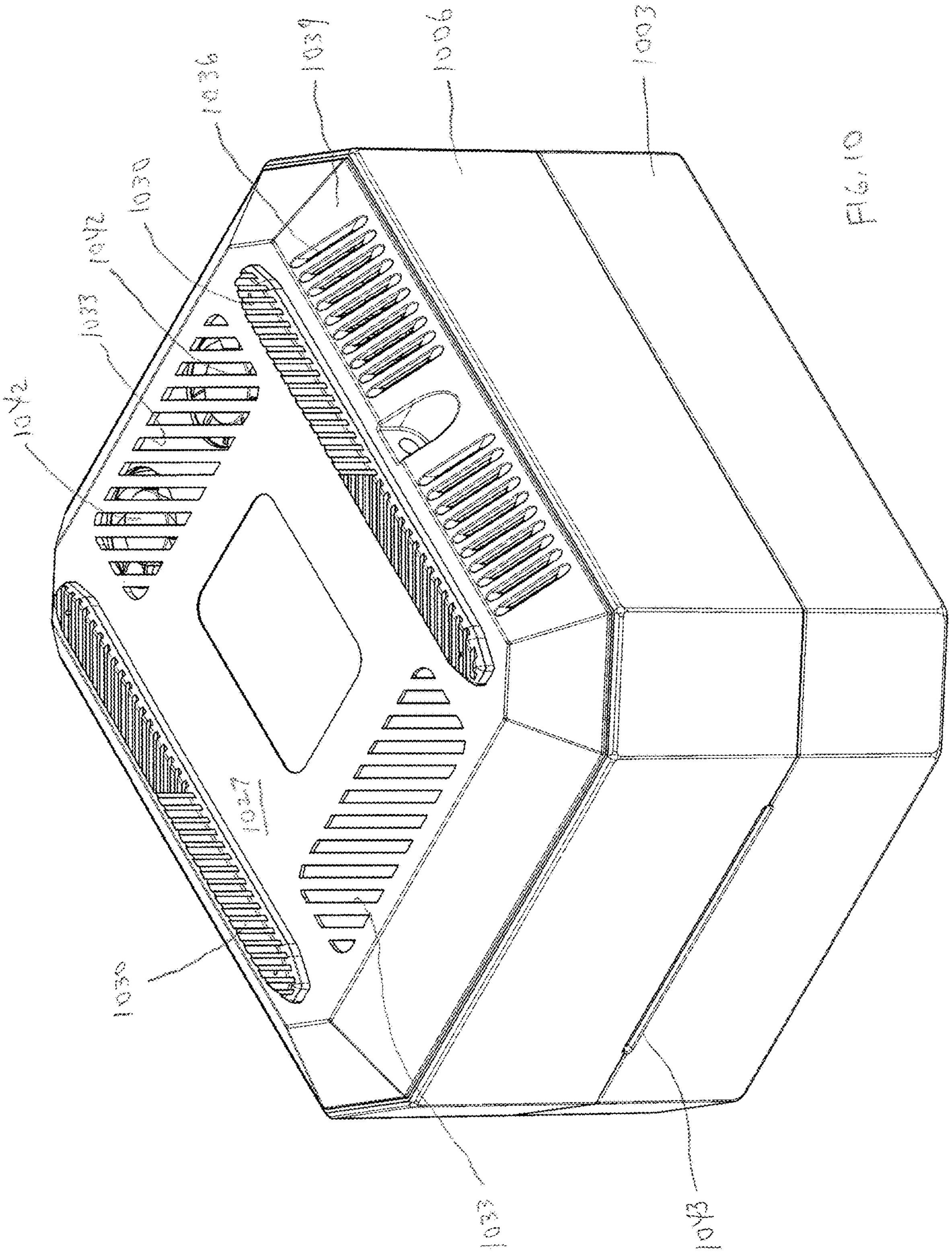
FIG. 10 is a bottom perspective view of the jewelry cleaning device shown in FIG. 9.

Turning to FIG. 10, the bottom surface 1027 of the lower housing assembly 1006 may be provided with ribbed portions 1030 to provide a non-slip surface. The bottom surface 1027 of the lower housing assembly 1006 may also be provided with one or more vent openings 1033 to provide ventilation and cooling. Vents 1036 may also be provided in an angled outer wall 1039 of the lower housing assembly 1006 for additional ventilation. In addition, the jewelry cleaning device 1000 may also be provided with one or more electric fans 1042 to provide for cooling the motors and electronics contained with the jewelry cleaning device 1000. A groove 1043 may be formed between the upper housing assembly 1003 and the lower housing assembly 1006 to provide for manually separating the two assemblies.

Figure 11:
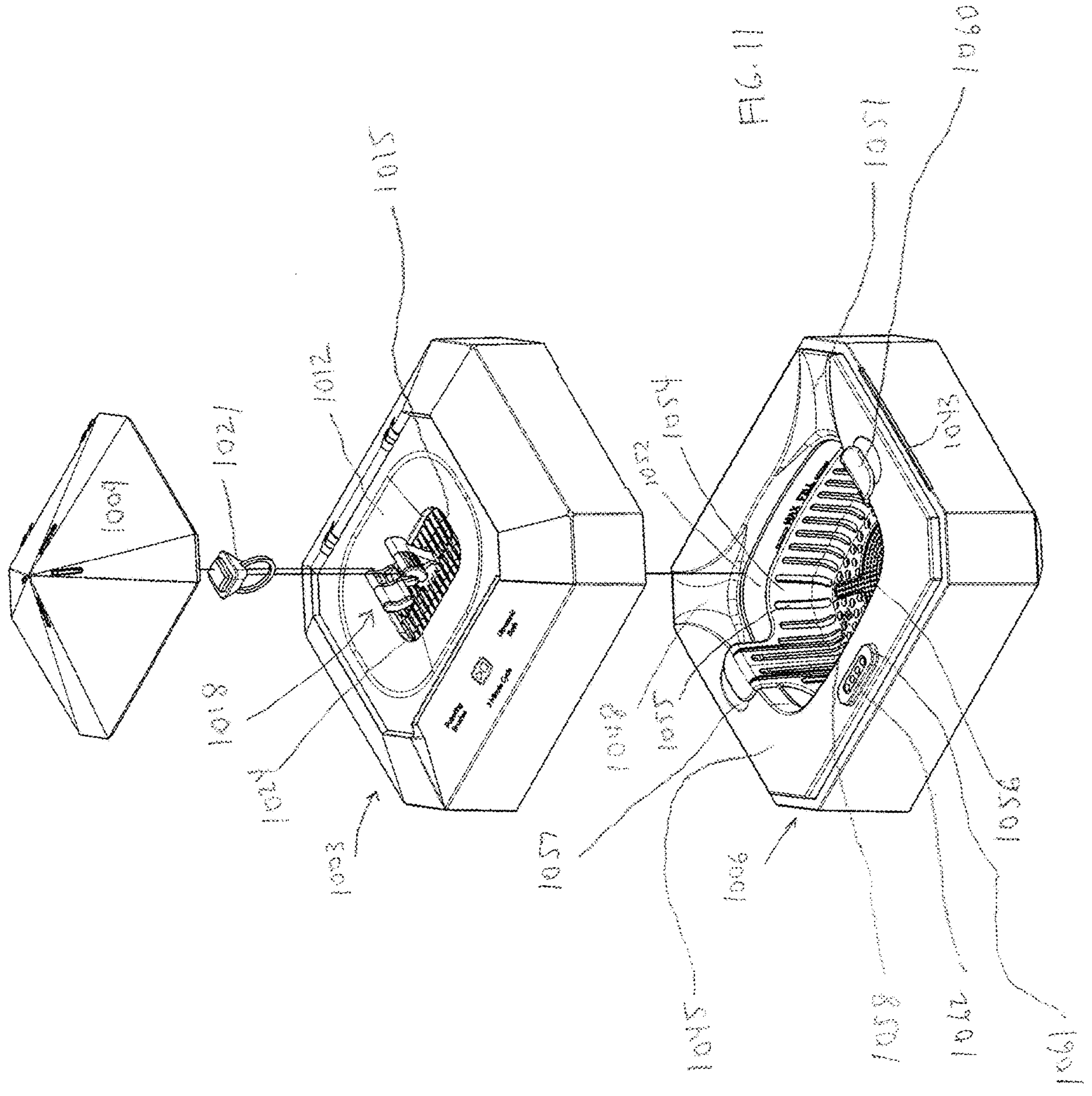
FIG. 11 is an exploded perspective view of the jewelry cleaning device shown in FIG. 9.

In FIG. 11, the upper housing assembly 1003 is separated from the lower housing assembly 1006. The top surface 1045 of the lower housing assembly 1006 may be provided with a pair of recessed portions 1048, 1051 that provide channels (best shown in FIGS. 14-15) for pouring the cleaning solution out of the bath 1052 in the lower housing assembly 1006. The channels formed by the recessed portions 1048, 1051 provide a pathway to avoid spillage of the cleaning solution. A tray or basket 1054 for holding jewelry items may be inserted into the bath 1052. The basket 1054 may be provided with slots 1055 or fine openings 1056 to allow the cleaning fluid to pass but the basket 1054 is configured at the bottom 1058 to trap debris that may be dislodged from the ring 1021 or other jewelry items in the basket 1054. The top surface 1045 of the lower housing assembly 1006 may be provided with one or more recessed portions 1057 that provide access for tabs 1060 on opposite sides of the basket 1054 for lifting the basket 1054 from the lower housing assembly 1006. A raised member 1061 may include one or more magnets 1062. The raised member 1061 may provide an alignment guide for placing the upper housing assembly 1003 onto the lower housing assembly 1006. The magnets 1062 may be configured to provide sufficient force to keep the assemblies 1003, 1006 together during use and transport, but still allow them to be manually separated by a user.

Figure 12:
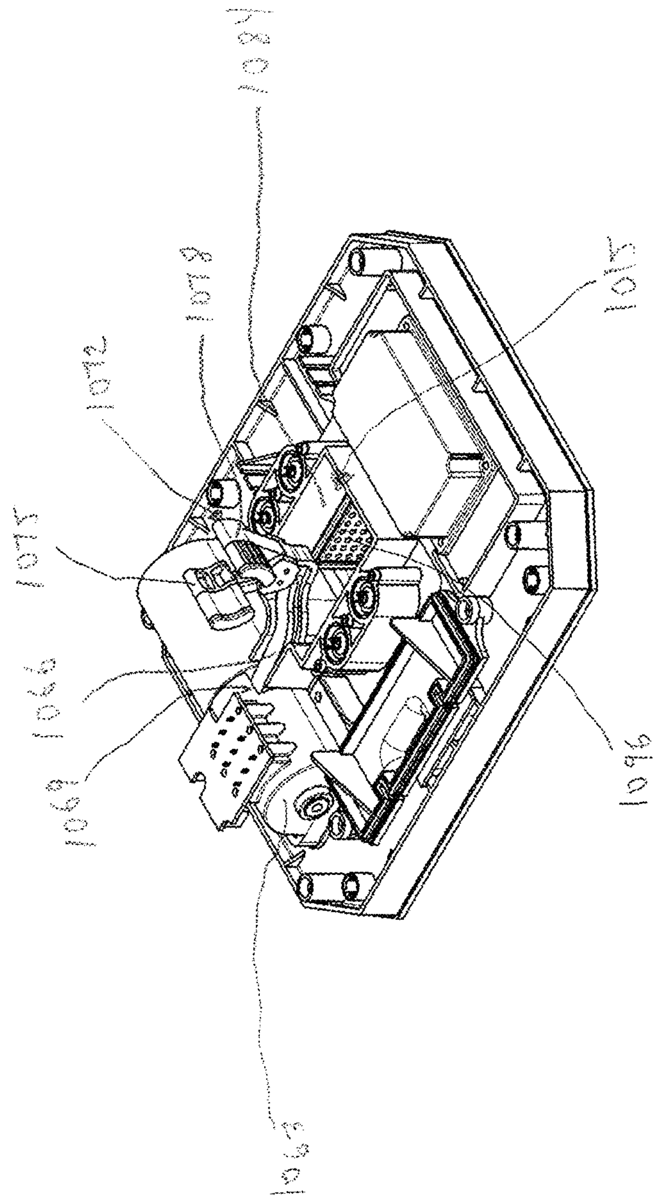
FIG. 12 is a partial perspective view of a portion of an upper assembly of the jewelry cleaning device of FIG. 9.

Turning to FIG. 12, the ring holder mechanism 1018 may include a ring arm motor 1063 operatively connected with a ring arm 1066 having a proximal end 1069 and a distal end 1072. The proximal end 1069 connects with an output shaft (not visible) on the right hand side of the ring arm motor 1063 for rotational movement about an axis. The distal end 1072 of the ring holder mechanism 1018 may include a pair of opposed members 1075 and 1078 that provide for removably attaching the ring 1021 to the ring arm 1066. The opposed members 1075 and 1078 are disposed in spaced apart relation above opening 1015. A brush housing 1084 is visible through the opening 1015.

Figure 13A:
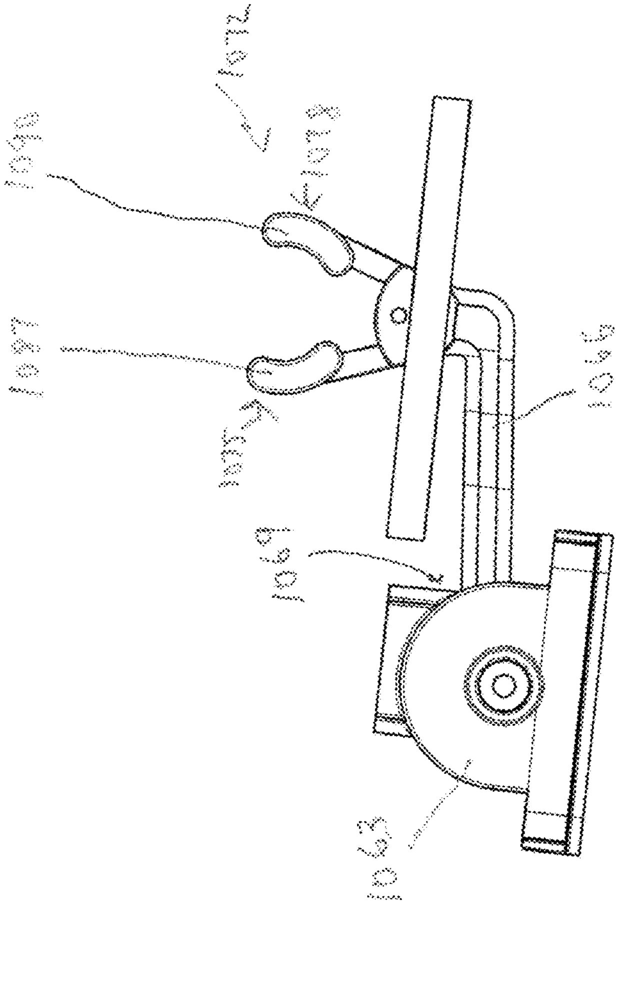
FIG. 13A is a side elevational view of a portion of the ring holder mechanism of the jewelry cleaning device of FIG. 9.
Figure 13B:
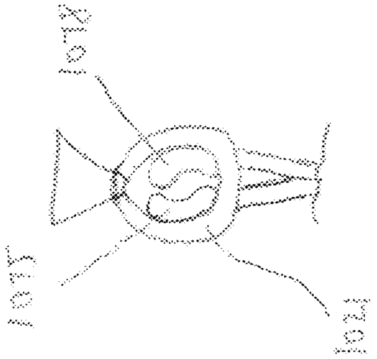
FIG. 13B is a partial detailed side elevational view showing a ring on the opposed members.
Figure 15:
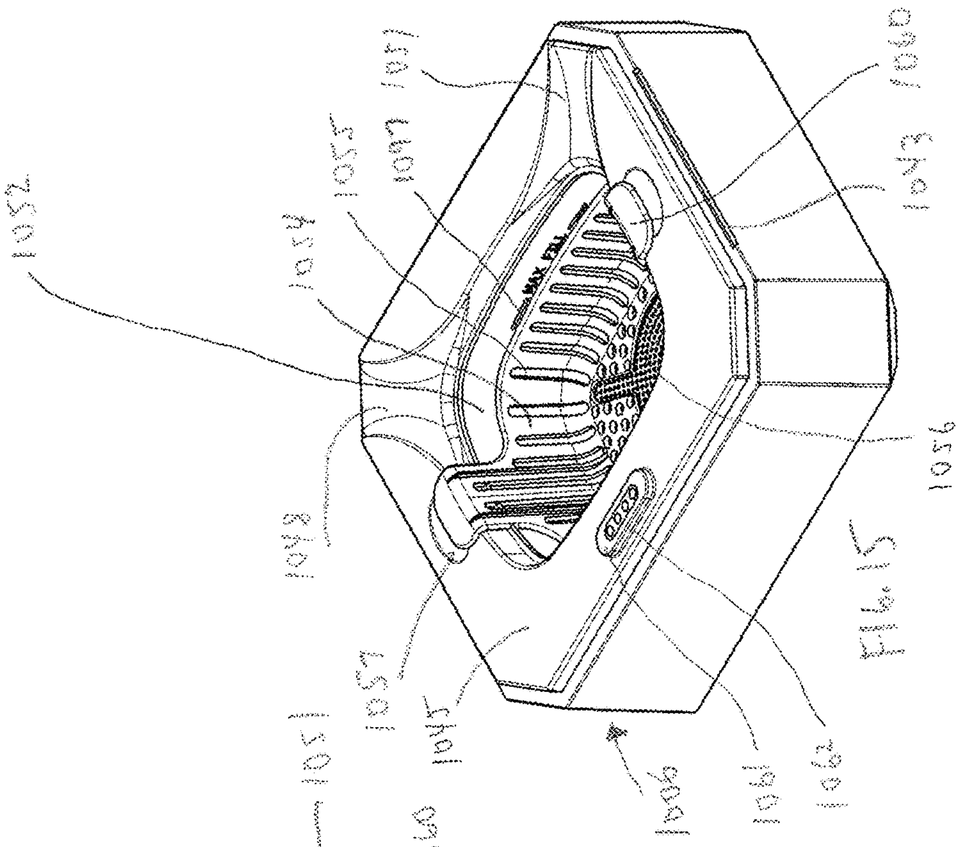
FIG. 15 is a perspective view of the lower assembly of the jewelry cleaning device of FIG. 9.
Figure 14:
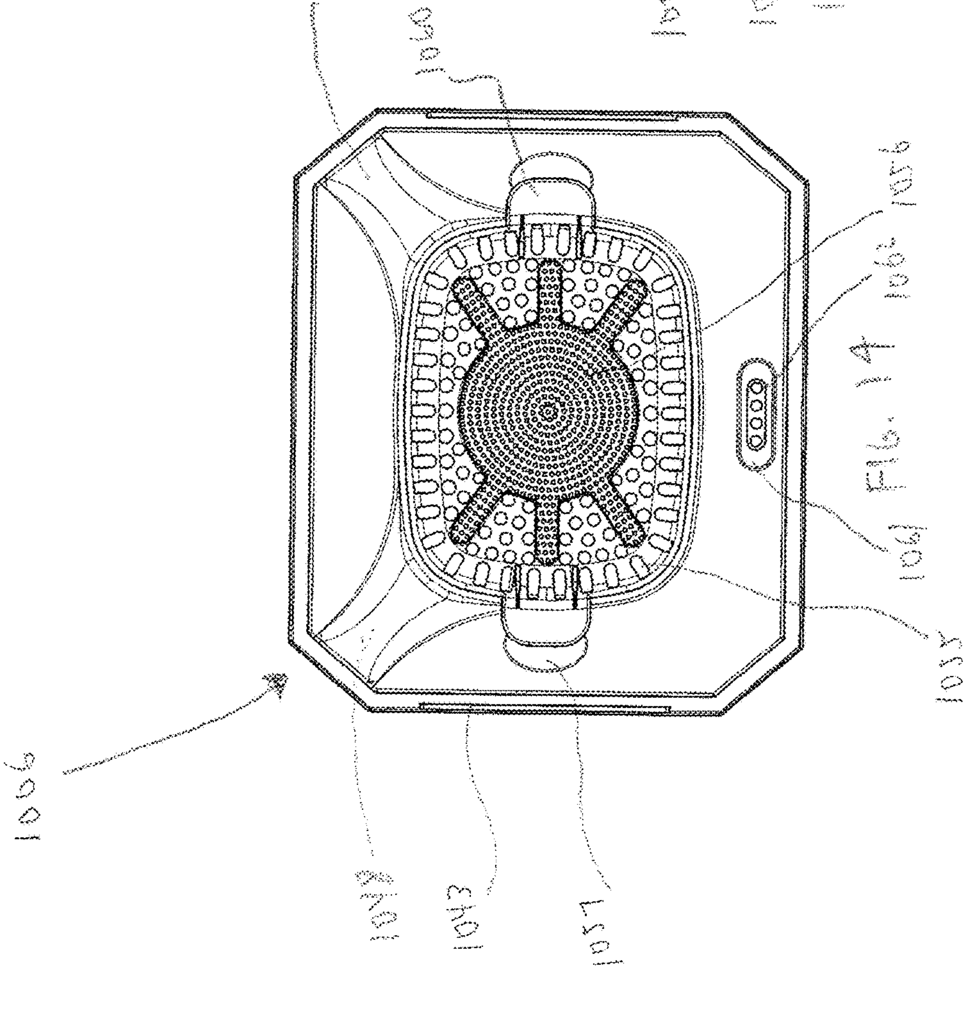
FIG. 14 is a top plan view of the lower assembly of the jewelry cleaning device of FIG. 9.

In FIG. 13A, the ring arm 1066 is shown in greater detail. The opposed members 1075 and 1078 may be spring biased in opposite directions by a torsion spring. Legs extending from each end of the torsion spring may provide an outward force pushing the two opposed members 1075 and 1078 away from each other such that they are spring biased in an open position. The opposed members 1075 and 1078 may be provided with curved ends 1087 and 1090 that may have ridges defined thereon. The curved ends 1087 and 1090 may be covered with silicone sleeves. In use (best shown in FIG. 13B), the two curved ends 1087 and 1090 are pushed together against the force of the torsion spring until the form a round shape and the ring 1021 is inserted over the curved ends 1087 and 1090 such that the opposed members 1075 and 1078 fit inside the opening in the ring 1021. The outward force of the opposed members 1075 and 1078 against the band of the ring 1021 holds the ring 1021 in position at the end of the ring holder mechanism 1018.

From the position shown in FIG. 13A (with the ring 1021 attached to the ring holder mechanism 1018), the ring arm motor 1063 causes the ring arm 1066 to rotate in the clockwise direction causing the opposed members 1075 and 1078 to carry the ring 1021 through the bristles 1024, into contact with the bristles in the brush assembly 1084 and finally into the bath 1052 in the lower housing assembly 1006, as will be described in greater detail herein.

Figure 16:
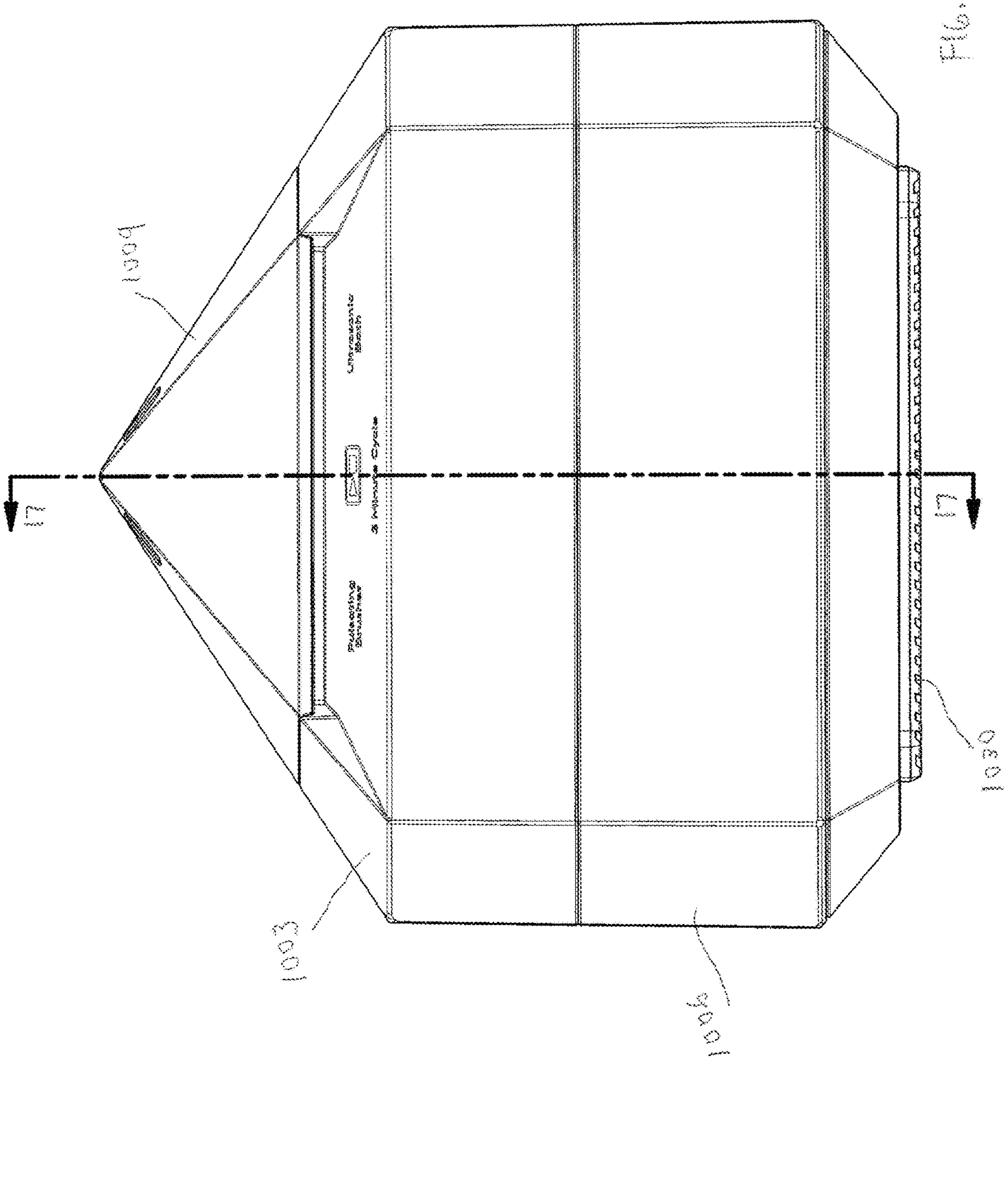
FIG. 16 is a front elevational view of the jewelry cleaning device of FIG. 9.
Figure 17:
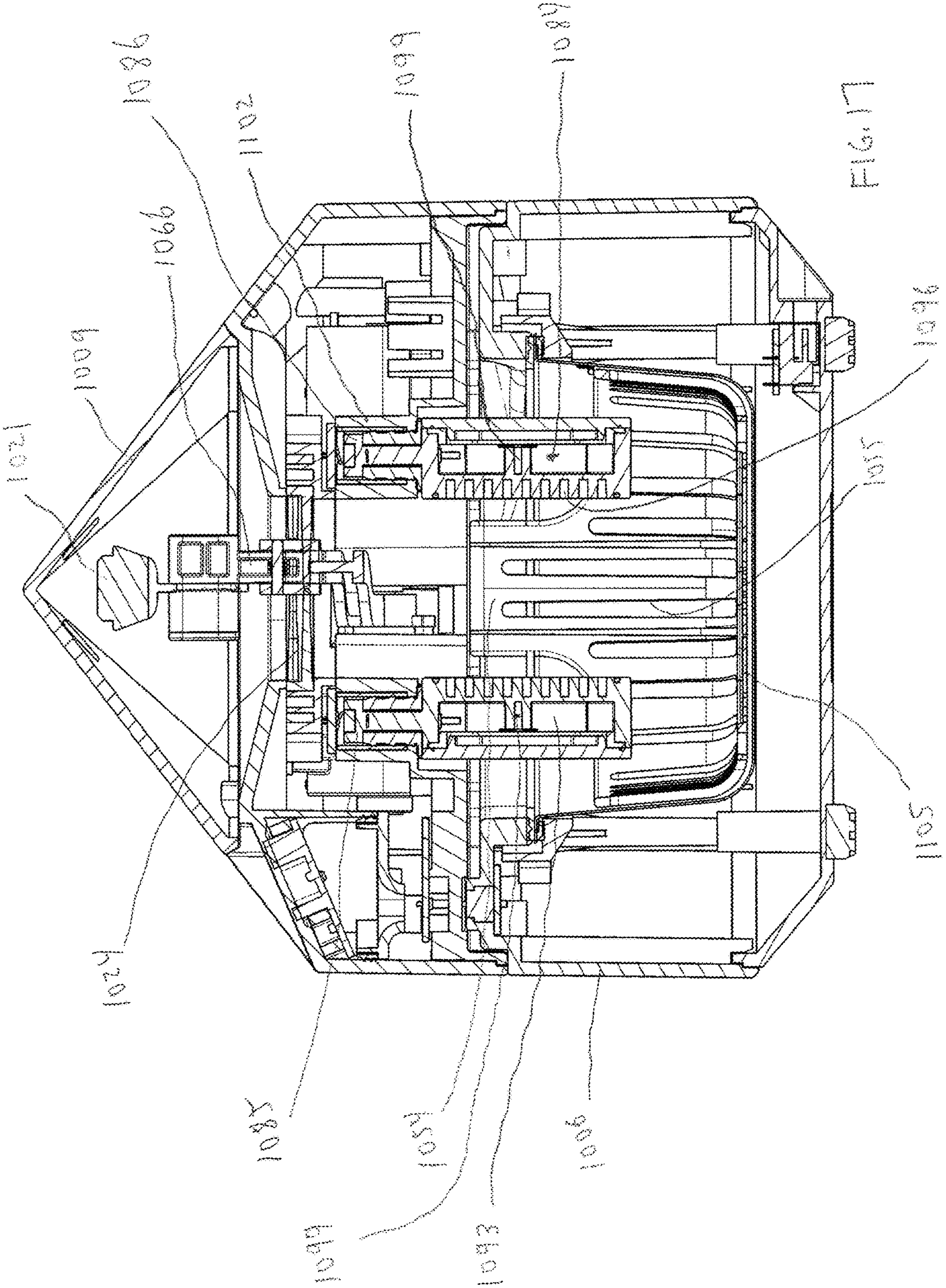
FIG. 17 is a sectional view taken along lines 17-17 of FIG. 16.

Turning to FIGS. 16, 17, brush housing 1084 is disposed on the right side of the figure and will be described in detail. Brush housing 1093 is similar in configuration and therefore will not be describe in detail. For clarity the brush housing 1084 is shown with the bristles removed. The bristles on the brush housing 1084 may be stiffer than the bristles 124 at the opening 1015. The brush housing 1084 may be comprised of a bristle mounting pad 1096 mounted on the outside and a vibration motor 1099 disposed inside of a single housing 1084. Accordingly, the brush housing 1084 may be configured as a unitary replaceable unit that is inserted into the upper housing assembly 1003. The brush housing may comprise a pair of projecting members 1085 and 1086 that fit into a space formed in the upper housing assembly 1003. When the brush housing 1084 is inserted into the upper housing assembly 1003, electrical contact with a circuit may be made by electrical connectors such as pins or the like to connect the vibration motor 1099 to the electrical circuit in the unit. The vibration motor 1099 provides a pulsating motion to the bristle mounting pad 1096 which results in pulsating bristles 1024 contacting the exposed surfaces of the ring 1021. As shown, the bristle mounting pad 1096 may extend into the bath 1052 area below the fill line 1097 (FIG. 15) for the cleaning solution.

The bath 1052 of the lower housing assembly 1006 may be provided with a transducer 1105 mounted to the bath 1052. The transducer 1105 may be centered and located snug against the bottom wall of the bath 1052. The bath 1052 provides for ultrasonic cleaning in combination with the pulsating bristles.

The control of the ring holder mechanism 1018 and the movement between the different positions above the bristles 1024, through the bristles in the brush housing 1084 and into the bath 1052 may be as described above in connection with the first embodiment.

A jewelry cleaning device has been described above in connection with more than one embodiment. Modifications and alterations will occur to those upon reading and understanding the preceding detailed description. For example the ring holder could be used with other cleaning mechanisms or perhaps only used with the cleaning brushes or the bath. Other modifications can also be provided. The invention, however, is not limited to only the embodiment described above. Instead, the invention is broadly defined by the appended claims and the equivalents thereof.

The invention claimed is:

1. A jewelry cleaning device for cleaning a ring with a cleaning solution, the jewelry cleaning device comprising:

a housing including an upper housing assembly disposed on a lower housing assembly, the upper housing assembly configured to move between an open and a closed position relative to the lower housing assembly;

a bath located in the lower housing assembly and configured to hold the cleaning solution;

a cleaning brush mounted to the upper housing assembly;

a ring holder supported by the upper housing assembly and configured to rotate about an axis disposed on the upper housing assembly hold the ring, and a transducer cooperating with the bath for vibrating the bath wherein when the upper housing assembly is in the closed position, the ring holder being is movable with respect to the housing between a first position where the ring holder positions the ring offset from the bath and the cleaning brush and a second position where the ring holder positions the ring in the bath.

2. The jewelry cleaning device of claim 1, wherein at least a portion of the cleaning brush is disposed in the cleaning solution in the bath when the upper housing assembly is in the closed position.

3. The jewelry cleaning device of claim 1, further comprising a plurality of bristles supported by the upper housing assembly and positioned above the cleaning brush, wherein the ring holder positions the ring above the plurality of bristles when in the first position and the ring holder positions the ring below the plurality of bristles when in the second position, and wherein the ring holder moves through at least a portion of the plurality of bristles.

4. The jewelry cleaning device of claim 1, wherein the cleaning brush further comprises a cleaning brush housing with bristles and a vibration motor disposed thereon.

5. The jewelry cleaning device of claim 1, wherein the ring holder includes a fixed grip and a movable grip that is moveable with respect to the fixed grip.

6. The jewelry cleaning device of claim 1, wherein the upper housing assembly includes a lid pivotable with respect to the an upper housing between the open position and the closed position.

7. The jewelry cleaning device of claim 6, further comprising one or more magnets disposed on one of the upper housing assembly and the lower housing assembly, the magnets configured to provide a force holding the upper housing assembly and the lower housing assembly together.

8. The jewelry cleaning device of claim 6, further comprising a raised portion on one of the upper housing assembly and lower housing assembly and an opening on the other of the upper housing assembly and the lower housing assembly such that the raised portion provides an alignment guide for connecting the upper housing assembly to the lower housing assembly.

9. The jewelry cleaning device of claim 1, wherein the ring holder comprises a pair of opposed members spring biased in the open position, the opposed members configured to fit inside a band portion of the ring to hold the ring in position.

10. The jewelry cleaning device of claim 9, further comprising a silicone material disposed on at least one of the opposed members.

11. A jewelry cleaning device for cleaning a ring with a cleaning solution, the jewelry cleaning device, comprising:

a housing;

a bath located in the housing and configured to hold the cleaning solution;

a cleaning brush housing mounted to the housing, the cleaning brush housing having bristles and a vibration motor disposed thereon;

a ring holder connected with the housing and configured to hold the ring, the ring holder being movable with respect to the housing between a first position where the ring holder positions the ring offset from the bath and the cleaning brush and a second position where the ring holder positions the ring in the bath;

a transducer cooperating with the bath for vibrating the bath;

wherein the housing further comprises an upper housing assembly removably attached to a lower housing assembly;

wherein the bath is exposed and removable from the lower housing assembly when the upper housing assembly is in the open position with respect to the lower housing assembly; and, further comprising a first electrical connector electrically connected with the transducer, and a second electrical connector for connecting with a power source, wherein the first electrical connector is disconnectable with the second electrical connector when the bath is removed from the lower housing assembly.

12. A jewelry cleaning device for cleaning a ring with a cleaning solution, the jewelry cleaning device comprising:

a housing including an upper housing assembly disposed on a lower housing assembly, the upper housing assembly configured to move between an open and a closed position relative to the lower housing assembly;

a bath located in the lower housing assembly and configured to hold the cleaning solution;

a cleaning brush mounted to the upper housing assembly, the cleaning brush having a cleaning brush housing with a vibration motor disposed thereon;

a ring holder supported by the upper housing assembly and configured to rotate about an axis disposed on the upper housing assembly, wherein when the upper housing assembly is in the closed positon, the ring holder being is movable with respect to the housing between a first position where the ring holder positions the ring offset from the bath and the cleaning brush and a second position where the ring holder positions the ring in the bath;

wherein when the ring holder moves from the first position to the second position the ring passes through a third position where it engages with the cleaning brush;

the ring holder having a pair of opposed members spring biased in an open position, the opposed members configured to rotate toward each other against the force of the spring to fit inside a band portion of the ring to hold the ring in position; and, a transducer cooperating with the bath for vibrating the bath.

13. A jewelry cleaning device for cleaning a ring with a cleaning solution, the jewelry cleaning device comprising:

a housing;

a bath located in the housing and configured to hold the cleaning solution;

a cleaning brush mounted to the housing, the cleaning brush having a cleaning brush housing with bristles and a vibration motor disposed thereon;

a ring holder connected with the housing and configured to hold the ring, the ring holder being moveable with respect to the housing between a first position where the ring holder positions the ring offset from the bath and the cleaning brush and a second position where the ring holder positions the ring in the bath, the ring holder having a pair of opposed members spring biased in an open position, the opposed members configured to rotate toward each other against the force of the spring to fit inside a band portion of the ring to hold the ring in position;

a transducer cooperating with the bath for vibrating the bath; and, wherein the housing further comprises an upper housing assembly and a lower housing assembly with one or more magnets disposed on at least one of the top surface of the lower housing assembly and the bottom surface of the upper housing assembly.

14. A jewelry cleaning device for cleaning a ring with a cleaning solution, the jewelry cleaning device comprising:

a housing;

a bath located in the housing and configured to hold the cleaning solution;

a cleaning brush mounted to the housing, the cleaning brush having a cleaning brush housing with bristles and a vibration motor disposed thereon;

a ring holder connected with the housing and configured to hold the ring, the ring holder being moveable with respect to the housing between a first position where the ring holder positions the ring offset from the bath and the cleaning brush and a second position where the ring holder positions the ring in the bath, the ring holder having a pair of opposed members spring biased in an open position, the opposed members configured to rotate toward each other against the force of the spring to fit inside a band portion of the ring to hold the ring in position;

a transducer cooperating with the bath for vibrating the bath; and, wherein at least a portion of the cleaning brush is disposed in the cleaning solution in the bath.

* * * * *